United States Patent
Li et al.

(10) Patent No.: US 9,092,497 B2
(45) Date of Patent: Jul. 28, 2015

(54) SYSTEM AND METHOD TO JOIN AND CUT TWO-WAY REST OVERLAY TREES FOR DISTRIBUTED KNOWLEDGE BASES

(75) Inventors: Li Li, Bridgewater, NJ (US); Wu Chou, Basking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 750 days.

(21) Appl. No.: 13/371,828

(22) Filed: Feb. 13, 2012

(65) Prior Publication Data
US 2013/0085993 A1 Apr. 4, 2013

Related U.S. Application Data

(60) Provisional application No. 61/540,637, filed on Sep. 29, 2011.

(51) Int. Cl.
G06F 17/30 (2006.01)
(52) U.S. Cl.
CPC ................................ G06F 17/30575 (2013.01)
(58) Field of Classification Search
CPC .......... G06F 17/30575; G06F 17/2252; G06F 17/227
USPC .................... 707/786, 797, 610, 611
See application file for complete search history.

(56) References Cited

U.S. PATENT DOCUMENTS

| | | | | |
|---|---|---|---|---|
| 7,774,380 | B2* | 8/2010 | Burke et al. | 707/803 |
| 8,041,573 | B2* | 10/2011 | Da Palma et al. | 704/270 |
| 8,107,944 | B2* | 1/2012 | Cohan | 455/419 |
| 2008/0263207 | A1* | 10/2008 | Popescu et al. | 709/226 |
| 2009/0198702 | A1* | 8/2009 | Novik et al. | 707/10 |
| 2011/0119652 | A1* | 5/2011 | Yu et al. | 717/108 |

* cited by examiner

*Primary Examiner* — James Trujillo
*Assistant Examiner* — Fatima Mina
(74) *Attorney, Agent, or Firm* — Maldjian Law Group LLC; John Maldjian; William J. Connelly, III

(57) ABSTRACT

System and method of event-driven synchronization of a database distributed among servers connected in a tree topology, including: transmitting, from a root server, a composition request to a first level of child servers of the root server; recursively transmitting, from each child server of a first level, a composition request to child servers at a second level, wherein the second level is lower than the first level; recursively transmitting, from each child server of the second level, a notification message to child servers at the first level, wherein the notification message comprises an identification of database fragments accessible to the child server; transmitting, from child servers at the first level, respective notification messages to the root server, wherein the root server synchronizes an availability of database fragments from the respective notification messages transmitted to the root server. Subtrees may be cut from or joined to the tree topology.

15 Claims, 9 Drawing Sheets

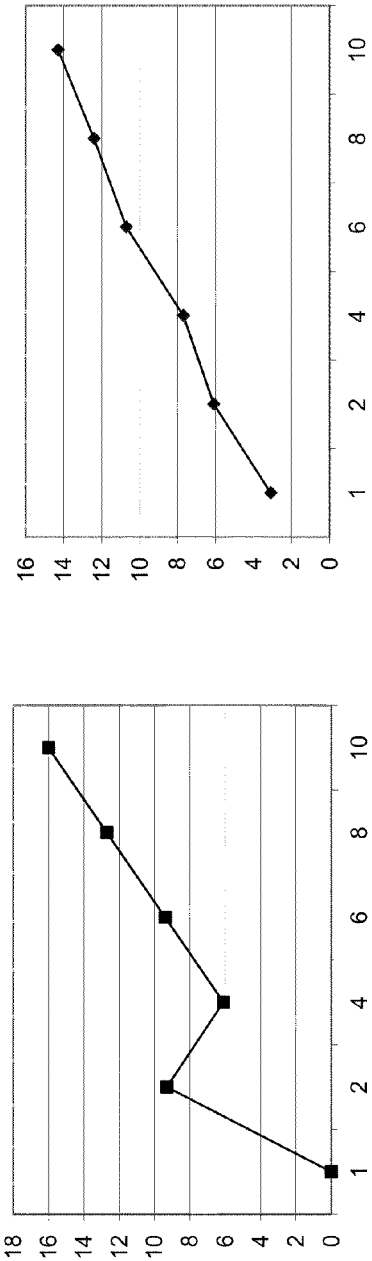
FIG. 7 700
FIG. 6 600
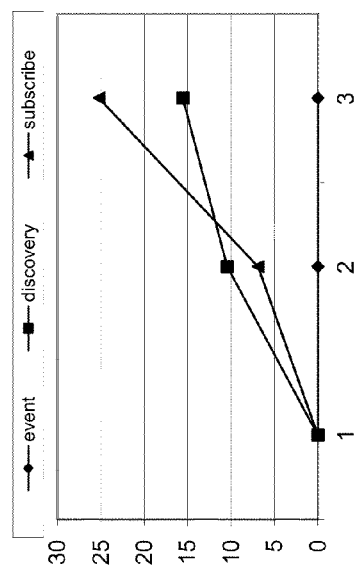
FIG. 8 800

SYSTEM AND METHOD TO JOIN AND CUT TWO-WAY REST OVERLAY TREES FOR DISTRIBUTED KNOWLEDGE BASES

CROSS-REFERENCE TO RELATED APPLICATIONS

This application claims the benefit of U.S. Provisional Patent Application Ser. No. 61/540,637, filed on Sep. 29, 2011, the content of which is hereby incorporated by reference in its entirety.

BACKGROUND

1. Field of the Invention

Embodiments of the present invention generally relate to maintaining distributed knowledge bases. More specifically, embodiments of the present invention relate to a system and method for maintaining distributed knowledge bases, topologically distributed as overlay trees, by use of REST web services.

2. Description of the Related Art

There is a huge amount data in enterprises that can be harvested into knowledge bases using well-defined semantic web technologies including Resource Description Framework ("RDF") and ontologies. In most cases, these knowledge bases will be managed by different organizations without any central coordination. These knowledge bases will also be highly dynamic as each organization changes them frequently and independently. To address these issues, there is a need for a method to transform the dynamic and complex knowledge bases into reusable knowledge services that can be easily integrated with other enterprise applications.

As the Web is becoming a communication and collaboration platform, there is an acute need for an infrastructure to disseminate real-time events over the Web. However, such infrastructure is still seriously lacking certain capabilities, because conventional distributed event-based systems are not designed for the Web.

An architectural style that underlies the Web is REpresentational State Transfer ("REST"). A web service that is compatible with REST is said to be "RESTful." Event-based distributed systems using REST services have been studied. Recursive REST service composition frameworks have been developed for supporting semantic based proactive search in enterprise. But those systems and frameworks do not provide Virtual Knowledge Bases ("VKBs") for clients to select or synchronize updates to knowledge bases.

Systems to store large RDF triple stores in networked computers have been studied. However, these systems are designed to support SPARQL queries, not knowledge virtualization and synchronization for REST services.

As used herein, the term "MapReduce" refers to a scalable relevance search algorithm as known to persons of skill in the art. In particular, one implementation of MapReduce may be described at least in part by U.S. Pat. No. 7,650,331 to Dean et al., the entire content of which is hereby incorporated by reference in its entirety. As used herein, the term "Hadoop" refers to an open-source version of MapReduce, as known to persons of skill in the art. Hadoop is a software system that supports data-intensive distributed applications. Hadoop enables applications to work with thousands of nodes and petabytes of data. However, MapReduce is a programming model, not a REST service framework. Also, MapReduce does not provide knowledge virtualization or synchronization for the map and reduce functions because the data used by MapReduce is not controlled by it.

Message-Passing Interface ("MPI") is a message-passing library interface specification. MPI may provide portability and ease of use in a distributed memory communication environment in which the higher level routines and/or abstractions are built upon lower level message-passing routines. Scalability may be enhanced by providing vendors with a clearly defined base set of routines that they can implement efficiently, or provide hardware support for. Interior nodes in a two-way overlay tree can be regarded as massively parallel computers, and MPI can be used for communication and synchronization between nodes. However, MPI does not follow REST architectural style, therefore at least some of the benefits of REST are not available.

The VKB can be managed by parallel and distributed database systems. However, such an approach introduces database coupling into a distributed system that is not based on REST services. Database coupling refers to servers used by a distributed database system, in particular to an additional layer of communication between the servers, used by the distributed database system.

Some Peer to Peer ("P2P") networks allow a node to join or leave the network at random. Some systems use structured P2P technologies to support distributed databases and RDF stores. However, these systems are based on Distributed Hash Table ("DHT") techniques that partition the nodes and data into the same key space, such that the partition of data and the topology of the nodes is not completely independent. Furthermore, the P2P protocols are not based on REST.

Thus, there is a need for a system and method to maintain distributed databases, for example, in enterprise systems and networks, using REST web services.

SUMMARY

Embodiments in accordance with the present invention transform distributed knowledge bases into a distributed hypermedia system using REST web services, because REST encourages independent development and maintenance of components and fragments in the distributed system. In addition, REST supports flexibility, usability, simplicity, efficiency, scalability and extensibility.

To support decentralized and incremental development of large scale, dynamic and complex knowledge based applications in enterprises where knowledge is managed by different organizations and is often changing, embodiments in accordance with the present invention provide a system and method to access and synchronize distributed knowledge bases through REST services. Embodiments in accordance with the present invention transform these knowledge bases into a distributed hypermedia system using REST web services. REST web services are suitable because REST encourages independent development of components in the distributed system. In addition, REST supports flexibility, usability, simplicity, efficiency, scalability and extensibility.

In some embodiments, a system includes a tree structured overlay network of REST servers connected by two unidirectional links: composition links and notification links. Composition links provide transparent access to distributed knowledge bases through recursive composition of replicated knowledge services. Notification links provide knowledge synchronization through events triggered by updates to knowledge bases. Together, the composition links and notification links permit bidirectional (i.e., two-way) communication. The synchronized knowledge bases enable clients to control the outcome of knowledge services and the knowledge services to avoid unnecessary compositions. A two-way overlay tree can be regarded as a special case of a broker overlay network.

A prototype system was implemented, and experimental studies on applications to enterprise knowledge bases were performed. Experimental results indicated that the proposed REST service method and processes are feasible and efficient.

Embodiments in accordance with the present invention may provide a system and method of event-driven synchronization of a database distributed among servers connected in a tree topology, the method comprising: transmitting, from a root server, a composition request to a first level of child servers of the root server; recursively transmitting, from each child server of a first level, a composition request to child servers at a second level, wherein the second level is lower than the first level; recursively transmitting, from each child server of the second level, a notification message to child servers at the first level, wherein the notification message comprises an identification of database fragments accessible to the child server; transmitting, from child servers at the first level, respective notification messages to the root server, wherein the root server synchronizes an availability of database fragments from the respective notification messages transmitted to the root server.

Optionally, the method may further include the steps of: pausing a processing of update events; retrieving a reference count from a root node of a subtree to add to the tree topology; updating a database mapping in the root server; and resuming the processing of update events.

Certain embodiments in accordance with the present invention may also include the steps of: providing a delete command to child servers; and updating a database mapping in a parent server.

BRIEF DESCRIPTION OF THE DRAWING

So the manner in which the above recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments encompassed within the scope of the present invention, and, therefore, are not to be considered limiting, for the present invention may admit to other equally effective embodiments, wherein:

FIG. 6 illustrates experimental service discovery process completion times in accordance with an embodiment of the invention;

FIG. 7 illustrates experimental event subscription process completion times in accordance with an embodiment of the invention;

FIG. 8 illustrates experimental event processes completion times in accordance with an embodiment of the invention;

Figure 1:
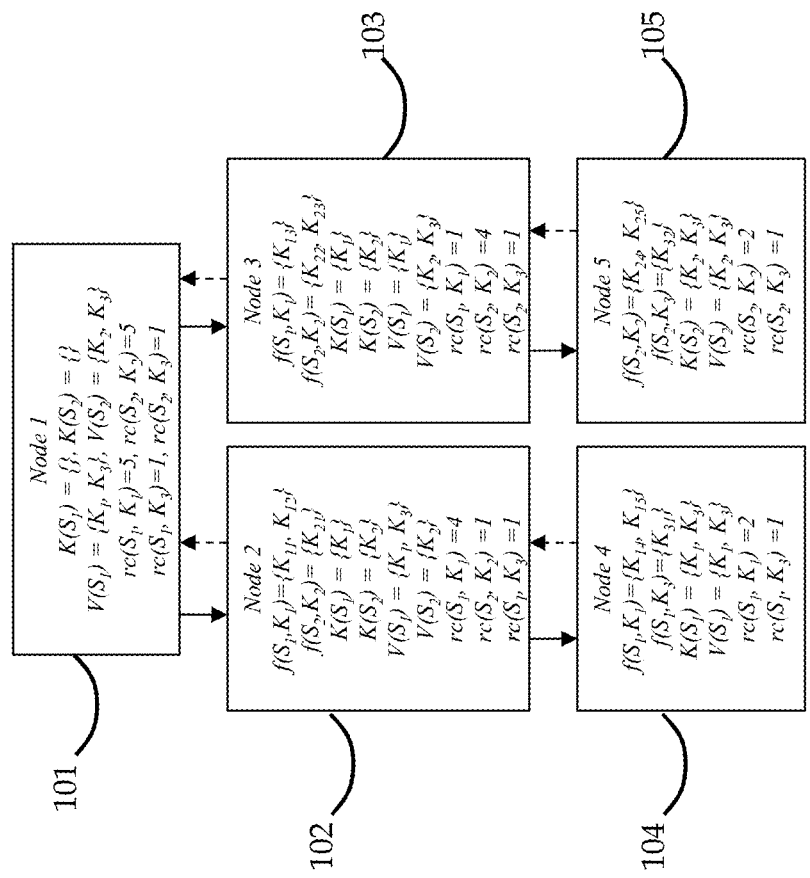
FIG. 1 illustrates a two-way REST overlay tree in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

Large scale knowledge bases often contain billions of facts and are distributed over networked machines. Each networked machine contains a fragment of the large scale knowledge base. Different organizations in an enterprise may manage and update the networked machines independently. A problem with the management of such a large scale knowledge base is how to enable transparent and efficient access to these dynamic and distributed knowledge bases to an end user. Embodiments in accordance with the present invention provide access by use of REST services, thereby achieving scalability, efficiency and flexibility.

Embodiments of the present invention generally relate to maintenance of distributed knowledge bases. More specifically, embodiments of the present invention relate to a system and method for querying and maintaining a distributed knowledge base, based upon Representational State Transfer web services.

As used herein in connection with embodiments of the present invention, the term "REST" refers to REpresentational State Transfer web services, as described below in further detail. REST provides resource management and promotes architectural choices that include:

1) Addressability—each resource can be addressed by Uniform Resource Identifier ("URI");

2) Connectedness—resources are linked to provide navigation;

3) Uniform Interface—all resources support a subset of a uniform interface between components, namely GET, PUT, DELETE and POST. GET is safe and idempotent (i.e., can be resubmitted if failed without corrupting resource states). PUT and DELETE are not safe but are idempotent.

4) Statelessness—all requests to a resource contain all of information necessary to process the requests, and the servers do not need to keep any context about the requests. Stateless servers are robust and easy to scale. Statelessness induces the properties of visibility, reliability, and scalability. Visibility is improved because a monitoring system does not have to look beyond a single request datum in order to determine the full nature of the request. Reliability is improved because it eases the task of recovering from partial failures. Scalability is improved because not having to store state between requests allows the server component to quickly free resources, and further simplifies implementation because the server does not have to manage resource usage across requests.

5) Layering: intermediate proxies between clients and servers can be used to cache data for efficiency. The layered system style allows an architecture to be composed of hierarchical layers by constraining component behavior such that each component cannot "see" beyond the immediate layer with which they are interacting. By restricting knowledge of the system to a single layer, layering places a bound on the overall system complexity and promote substrate independence. Layers can be used to encapsulate legacy services and to protect new services from legacy clients, simplifying components by moving infrequently used functionality to a shared intermediary. Intermediaries can also be used to improve system scalability by enabling load balancing of services across multiple networks and processors.

As used herein in connection with embodiments of the present invention, the term "RESTful" refers to a web service that is compatible with REST.

As used herein in connection with embodiments of the present invention, the term "R-Event" refers to a RESTful web service framework, and in particular to a RESTful web service framework which is usable to implement distributed event-based systems.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

Embodiments in accordance with the present invention provide a tree structured overlay network to connect the REST knowledge servers (also referred to as nodes) in an enterprise. A tree structure provides a single entry point, for instance by way of a uniform resource indicator ("URI"), for clients and is relatively easy to extend.

The tree structure includes a parent REST server node in direct communicative contact with one or more REST server child nodes. The knowledge base is formed from an overlay of the REST tree structure. In the tree structure, each REST server hosts a set of REST services. Each REST service accepts a request and returns a response by consulting available knowledge bases. The REST services in a node also interact with other services over the two-way links. The composition links allow parent services to send requests to their children services (e.g., in order to query the distributed database) and the notification links allow the children to send event notifications to their parents (e.g., to maintain a map of how the database fragments are distributed, and/or what database fragments are accessible to each child node including children of the child node). A large knowledge base is broken into fragments and distributed among the REST servers. As the result, a knowledge service can directly access the local knowledge bases stored in local memory or disk. A large database may be distributed in this way if, for instance, different fragments of the database are developed or maintained by different entities. For example, in an airline scheduling scenario, a database fragment pertaining to equipment status may be maintained by the airline's maintenance group, while a database fragment pertaining to crew availability may be maintained by a training or personnel group that tracks pilot qualifications on various aircraft and/or flying times, while a database fragment pertaining to available capacity may be maintained by a demand forecasting group.

Embodiments in accordance with the present invention provide transparent access to the distributed knowledge bases and a consistent view of them. Transparent access means that a knowledge service can consult a knowledge base regardless how it is distributed. A knowledge service may include a set of software tools and services to query a database, thereby providing local and/or remote access service to the knowledge base. A list of knowledge bases accessible from a node at any given time is referred to herein as view at that node. A consistent view presented to users tracks the knowledge bases used by each knowledge service as the knowledge bases undergo independent changes. It allows clients of these knowledge services to select appropriate knowledge bases to customize the response of a requested service in different situations. A client can contact any node in the tree. The views at that node tell the client what knowledge bases that node has, so the client can select a subset of the available knowledge bases, or not to use the node at all if the knowledge that the client wants is not stored there.

For example, when reading a medical document, a user may want an annotation service to just annotate concepts related to the medical knowledge bases. A consistent view also allows a parent service to avoid unnecessary composition link messages when its children do not have required knowledge bases.

To achieve these goals, we introduce the concept of a virtual knowledge base ("VKB") to refer to a set of knowledge bases distributed over a network, which are accessible to a knowledge service at a given point of time. Transparent access to virtual knowledge bases (i.e., transparent in the sense that a user does not need to know how the information is distributed) is achieved through recursive composition of knowledge services replicated over the network. For efficiency, a parent service sends identical service requests in parallel to its child services and combines the partial results from the children into the final response. The child services process a request recursively as its parent, i.e., the child sends requests as a parent to its own children. Consistent views are achieved by event-driven knowledge synchronization over notification links established by specialized REST services, as described below in further detail.

The network is formed from servers interconnected in a tree topology. A root server (i.e., root node) is a server which is a point of interface to and from a user. Each server in the tree topology will be connected in the tree topology at a level determined by the number of links that the server is removed from the root server. For example, child servers of the root server are at a first level. Servers are at a second level if they are children of servers at the first level, and so forth. The root is considered the highest level, and each successive level (or generation) beneath the root is at a lower level. A subtree is a self-contained portion of the tree topology, including a server and at least some child servers logically connected to the server, either directly or through intermediate child servers which also are included in the subtree. The highest-level server of the subtree may, in the context of the subtree, be referred to as a root node or a root node of the subtree. The root node of the full tree topology may also be treated as a root node of a subtree. Nodes at interior levels of the subtree may be both a child of a higher-level node, and a parent to a lower-level node.

The tree topology may be considered to have a plurality of levels or generations that are determined by how many links separate servers at that level from the root node. For instance, child nodes of a root node are at a first level and are separated from the root by one link. Child nodes are at a second level if they are children of nodes at the first level, and child nodes at the second level are separated from the root by two links. The first level is considered higher than the second level. This model may be extended for additional levels.

Each server may include a processor, a memory coupled to the processor, a receiver, transmitter, transceiver, and/or I/O interfaces. Transceiver couples the server to an internal and/or external communication path such as an Ethernet connection or an RF connection. RF connection may be WiFi, Bluetooth, ZigBee, UWB, or similar technologies used for RF networking. I/O interfaces, couple the server to one or more optional user input/output (I/O) devices (e.g., display screen, keyboard, mouse, etc.). Memory stores data and/or program instructions used by the processor. Memory may include permanent, non-volatile memory (e.g., ROM), or volatile memory (e.g., RAM), or rewritable memory (e.g., hard drive or flash memory), or any combination thereof. The program instructions, when executed by the processor, carry out the processes performed by the server.

Two-Way Rest Overlay Tree

Assume that a two-way overlay free T includes a set of REST servers (nodes): T={P|P is a REST server} that form a tree determined by the function c(P)={C|C is a child of P}. Each node P contains a set of replicated REST services: s(P)={$S_i$|$S_i$ is a REST service}. There are two types of services: 1) a management service ("MS"), which maintains event channels (i.e., a communication link between two nodes such that one node can send event notifications to the other); and 2) a knowledge service ("KS"), which provides knowledge to clients. The services replicated at different nodes perform the same function but their output depends on the states of those nodes. The output may depend upon the state of the node if, for example, one node has knowledge about "Avaya" from Wikipedia and another node has knowledge about "Avaya" from an internal database. In that situation, the two nodes will tag the word "Avaya" differently based on their knowledge bases.

The tree T stores a set of knowledge bases K(T)={$K_j$|$K_j$ is a KB}. Each knowledge base ("KB") includes one or more fragments (i.e., portions or sections) of a larger knowledge base: $K_j$={$K_{jk}$|$K_{jk}$ is a fragment}. $f(P,S_i,K_j)$={$K_{jk}$|$K_{jk} \in K_j$} denotes the fragments of $K_j$ used by knowledge service $S_i$ on node P. K(P, $S_i$)={$K_j$|$f(P,S_i,K_j) \neq \emptyset$} denotes the knowledge bases used by knowledge service $S_i$ on node P. In other words, a knowledge service uses a knowledge base as long as the knowledge service uses one of its fragments.

FIG. 1 illustrates a two-way REST overlay tree 100 with five nodes (node 101, node 102, node 103, node 104 and node 105) that are connected by composition links (identified by solid arrows) and notification links (identified by dashed arrows). In this context, the notification links are not optional. The $f$ and K functions are shown where the node arguments are omitted for brevity. Because node 1 does not store any fragments, its $f$ functions are not shown.

To obtain the virtual knowledge base for service $S_i$ on node P, each node transmits composition messages to request information from its child nodes in order to calculate a function $V(P,S_i)$ recursively according to Equation (1), in which each C is a child node of node P, and in which the function $V(P,S_i)$ represents a view of the virtual knowledge base of a service $S_i$ on node P $$V(P, S_i) = K(P, S_i) \cup \bigcup_{C \in c(P)} V(C, S_i) \qquad (1)$$

For example, knowledge service $S_1$ on node 1 gains access to $K_1$ and $K_3$ on nodes 2, 3, 4 by recursively composing with the replicated $S_1$ on those nodes. Similarly, $S_1$ and $S_2$ on any node have their own virtual knowledge bases. In general, the virtual knowledge base of any parent service includes the virtual knowledge bases of all its child services.

Because a knowledge base is included in a virtual knowledge base as long as at least one fragment of the knowledge base is included in the virtual knowledge base, we need to keep track of the remaining fragments of each knowledge base when fragments are deleted. A fragment may be deleted when, for example, an organization that maintains a fragment of the virtual knowledge base performs routine maintenance on fragment of the knowledge base thus taking it offline, or when the knowledge base is updated to remove information in the fragment. For example, deleting fragment $K_{24}$ from node 5 in FIG. 1 does not remove $K_2$ from the virtual knowledge bases in other nodes because $K_2$ has remaining fragments, but deleting fragment $K_{31}$ in node 4 removes $K_3$ as it is the only fragment of $K_3$ in the example of FIG. 1.

To support fragment deletions, each node calculates a reference count function $rc(P,S_i,K_j)$ that records the number of knowledge base fragments $K_{jk}$ used by service $S_i$ in a tree rooted at node P. The "k" subscript indexes the fragments of a knowledge base, as each knowledge base usually has different number of fragments. Any node in the tree can store fragments of different knowledge bases used by different services. The function can be calculated recursively according to Equation (2), in which the function $f(\ )$ represents the set of fragments of knowledge base Kj used by service Si on node P:

$$rc(P, S_i, K_j) = |f(P, S_i, K_j)| + \sum_{C \in c(P)} rc(C, S_i, K_j) \qquad (2)$$

In an overlay tree, whenever there is a change to a virtual knowledge base on any interior node (i.e., a node that has a parent node), Equations (1) and/or (2) will be violated until the change is propagated to all the affected parent nodes. Embodiments in accordance with the present invention attempt to minimize the cost of propagating the change to the affected parent nodes, which in turn should minimize the amount of time that the equations are violated. To be independent of physical computers and networks, we define the cost to be the total number of messages needed to correct the violations and the number of links to deliver the corrective messages. A "violation" is a state of the overlay tree, such that Equation (1) and/or Equation (2) is not true for at least one node in the overlay tree. A violation may occur whenever a node adds or deletes a knowledge base fragment without having yet informed other relevant parent nodes in the overlay tree of the addition or deletion. The overlay tree remains in the violation state until such time that sufficient corrective messages have been exchanged among the affected parent nodes to inform them of the addition or deletion of the knowledge base fragment. "Violation time" is an amount of time during which a violation of Equation (1) and/or Equation (2) exists in the overlay tree. It is evident the violation time is proportional to the time needed to deliver the number of corrective messages over the longest path in an overlay tree. Since the longest path in a tree is fixed and not affected by changes to virtual knowledge base, embodiments in accordance with the present invention attempt to reduce or minimize the total number of corrective messages.

Event Driven Synchronization

In order to reduce the total number of corrective messages, embodiments in accordance with the present invention use an event-driven approach to treat uncoordinated knowledge updates as asynchronous events. An uncoordinated knowledge updates may be, for example, when an organization that maintains a fragment of the virtual knowledge base performs routine maintenance on the knowledge base thus taking it offline or back online, or when the knowledge base is updated to change information in the fragment. Updating the knowledge base to add or delete a knowledge base fragment causes an update event. In the absence of a fault (e.g., any condition that prevents the normal program execution, such as disk or network failure), each update event will trigger at most one corrective message, although several events may be addressed in one corrective message. Therefore, the number of corrective messages is bound by the number of events. By setting up proper notification links (i.e., event channels), the messages will propagate along a shortest path such that the violation time for Equations (1) and (2) is reduced or minimized.

Event Channel Processes

The event channels are managed by the management service hosted on special resources: a directory resource, a monitor resource and a listener resource. The directory resource returns the initial virtual knowledge base for each node. The monitor and listener resources are used to set up the event channels through subscription. The monitor resource accepts subscriptions and the listener resource accepts event notifications. The directory resource at node P provides the single entry point to other resources and its URI is denoted by URI(P, directory). Based on these resources, a two-way overlay tree can be created in two steps:

First, an administrator configures the following values for each node P: 1) c(P)={URI(C,directory)|C is a node}, with c(P) being the set of child nodes of node P and 2) $f(P, S_i, K_j)$ for each service $S_i$ on P. Then the administrator starts the nodes (i.e., launches a web server) in any order and each node computes the initial $K(P,S_i)$ values from the configurations.

Figure 2:
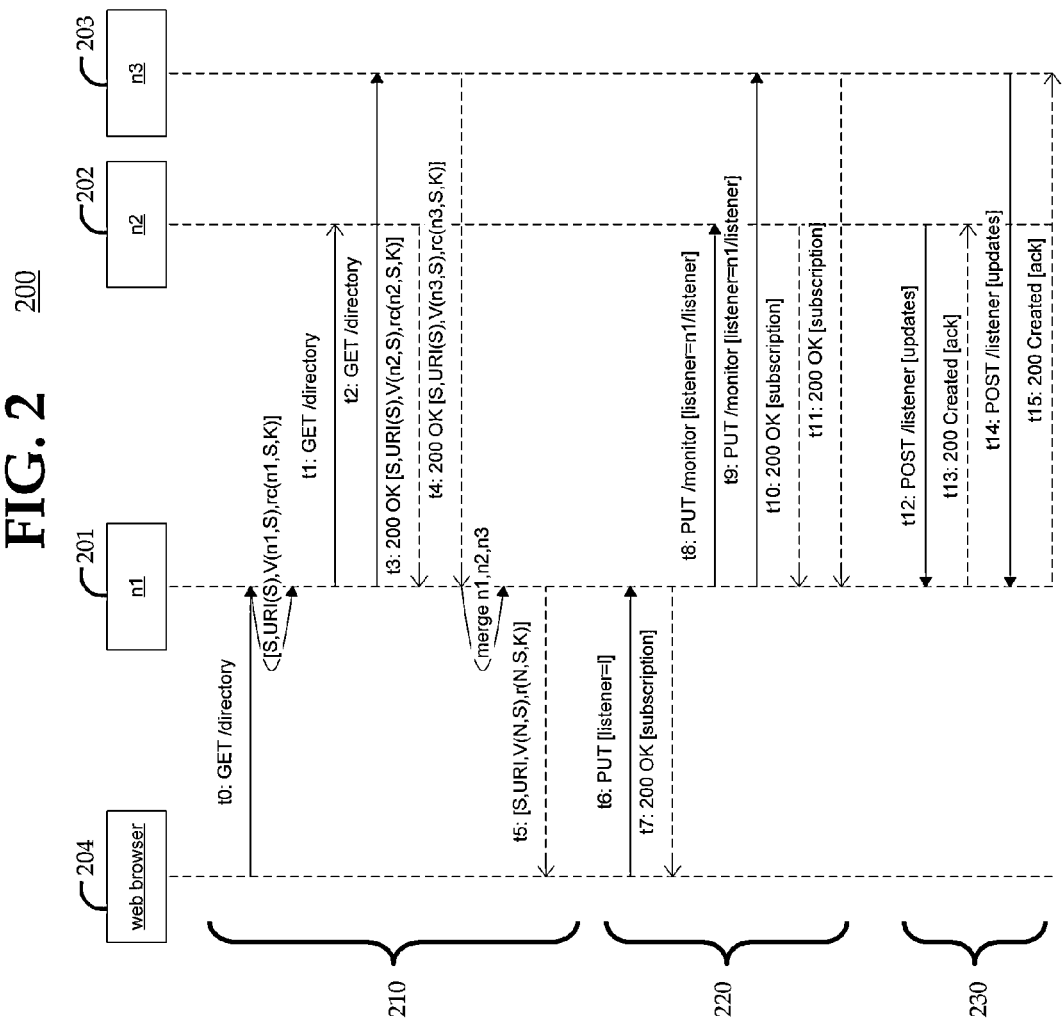
FIG. 2 illustrates sequence diagrams for Service Discovery, Event Subscription and Notification Processes in accordance with an embodiment of the present invention.

Second, the administrator uses a web browser to interact with the root node. These interactions trigger the nodes in the tree to exchange messages using one of three management service processes: service discovery, event subscription, and event notification. The service discovery process discovers the current virtual knowledge base (i.e., by calculating the V( ) function according to Equation (1)) on each node in the tree. The event subscription process establishes event channel from children to parent and the event notification process send notifications over the event channels. FIG. 2 is a sequence diagram that illustrates, with respect to the tree in FIG. 1, a service discovery 210, an event subscription process 220, and an event notification process 230. For clarity, only three nodes (201, 202, 203) and an administrative web browser 204 are shown in FIG. 1, wherein node 201 is a root node. The messages exchanged are numbered in FIG. 2 as t0 through t15.

Upon receipt of an initial message t0 from administrative web browser 204 to root node 201, REST service discovery process 210 includes parallel and recursive GET requests initiated by root node 201, as illustrated by message t1 and message t2. In service discovery process 210, the V(P, $S_i$) and rc(P,$S_i$,$K_j$) values on the child nodes 202 and 203 are calculated in parallel according to Equations (1) and (2). The values calculated by child nodes 202 and 203 are sent back in response message t3 and response message t4, from child nodes 202 and 203 respectively, to the root node 201. Root node 201 will combine its local values with the values returned in messages t3 and t4. Combined values are reported back to administrative web browser 204 by message t5. Upon completion of service discovery process 210, the initial V (P,$S_i$) and rc(P,$S_i$,$K_j$) values for each node 201, 202, 203 will have been calculated and each knowledge service will know the virtual knowledge bases of its children. For the complete tree in FIG. 1, the equations are calculated in a bottom-up fashion: first for node 4 and node 5, then node 2 and 3, and finally node 1.

RESTful event subscription process 220 begins with an initial message t6 from administrative web browser 204 to root node 201. Event subscription process 220 includes parallel and recursive PUT requests (in accordance with REST services) initiated by the root node 201, via message t8 and message t9. In process 220, event channels from children to parents are created in a top-down fashion. For example, in the full topology of FIG. 1, the event subscription process proceeds first from nodes 2 and 3 to node 1, then from node 4 to 2 and node 5 to 3. The complete event channels are shown by the dotted arrows in FIG. 1.

Referring again to FIG. 2, RESTful event notification process 230 includes POST requests and responses (in accordance with REST services) between child node 202 or child node 203 and its parent node 201, as illustrated by messages t12 and t14, and associated acknowledgements (messages t13 and t15).

If any knowledge base additions or deletions occur before the event channels are set up, those changes will be picked up by the initial discovery protocol. After the event channels are set up, knowledge base additions and deletions are permitted. Adding a knowledge base $K_j$ with c references to a set of services S triggers an event kb_added(S,$K_j$,c). For example, in FIG. 1, when two fragments of new knowledge base $K_4$ is added to $S_2$ in Node 5, an event kb_added({$S_2$}, $K_4$, 2) will be sent from node 5 to node 3 and then from node 3 to node 1. Similarly, deleting a knowledge base will trigger an event kb_deleted(S,$K_j$,c). Upon receiving the events, each node will update its V(P,$S_i$) and rc(P,$S_i$,$K_j$) values according to equations (3) and (4).

$$P \text{ receives kb\_added}(S, K_j, c): \qquad (3)$$
$$\forall S_i \in S \text{ on } P:$$
$$rc(S_i, K_j) \mathrel{+}= c$$
$$V(S_i) \cup = \{K_j\}$$
$$V(S_i) \cup = \{K_j\}$$

$$P \text{ receives kb\_deleted}(S, K_j, c): \qquad (4)$$
$$\forall S_i \in S \text{ on } P:$$
$$rc(S_i, K_j) \mathrel{-}= c$$
$$\text{if } rc(S_i, K_j) \leq 0 \text{ then } V(S_i) \mathrel{-}= \{K_j\}$$

As discussed with respect to Equations (1) and/or (2), function V($S_i$) represents a view of the virtual knowledge base of a service $S_i$ on node P; $K_j$ represents the jth knowledge base; {$K_j$} represents the set of all database fragments that make up $K_j$; and rc( ) is a reference count function.

Equations (1) and (2) are maintained (i.e., satisfied) if these equations are executed correctly by the nodes. Unexpected failures at the node, e.g., disk or network failures, may cause a node not to execute Equations (1) and (2) correctly. Correct execution requires that the events for equations (3) and (4) must be delivered and triggered exactly once and in the order they are generated. However, events in a batch notification (i.e., a notification which itself includes a list of individual notifications) may be in any order as long as they are executed in one transaction. Because multiple update events may arrive at a node at the same time, executions of these equations should be synchronized to avoid race conditions.

B. Complexity Analysis and Comparison

For an overlay tree of E edges (also referred to herein as "links"), the discovery process and the subscription process each results in E requests and responses. So the total number of messages required to set up the tree is 4E. Suppose the height of a tree is d (i.e., number of links in a longest path), the maximum network latency between nodes is $T_n$, and the maximum message processing time on the nodes is $T_s$, then the maximum time during which the Equation (1) is violated is the time it takes for the update event to travel the height of the tree: $T_v = d(T_n + T_s) + T_s$. The maximum number of messages in the notification process required to correct this violation is 2d.

In a poll based approach, wherein a node periodically contacts another node to learn its state changes with a poll interval of $T_p$, only the discovery process is required and the total number of messages for setup is 2E. The maximum violation time $2T_v + T_p$ is the time it takes for the root node to get the updates from the farthest leaf node by the end of the poll interval. The total number of messages in the service discovery process required to correct the violation is 2E. Therefore, in the worst case, the violation time of constant poll is more than twice of the event-driven approach. Similarly constant poll requires significantly more messages to correct a violation since 2E≥2d for typical overlay trees.

C. Tree Join and Cut Operations

Figure 3:
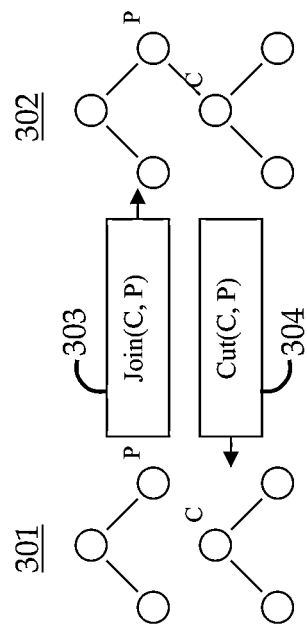
FIG. 3 illustrates network topologies before and after Join and Cut Operations in accordance with an embodiment of the invention.

Instead of creating a fixed two-way overlay tree for the entire enterprise in one step, it is more likely that the tree will be created incrementally from small trees owned by different organizations and portions of the tree may be removed for maintenance. To support these topological changes, FIG. 3 illustrates an exemplary Join process 303, in which two separate trees of configuration 301 are joined to produce a single tree in configuration 302. Conversely, FIG. 3 also illustrates an exemplary Cut process 304, in which the single tree in configuration 302 is cut into two separate trees of configuration 301. Join process 303 and Cut process 304 can be applied to trees that are in operation, without disrupting their services or losing any update events. Furthermore, processes 303 and 304 minimize the violation time and number of correction messages.

Figure 4:
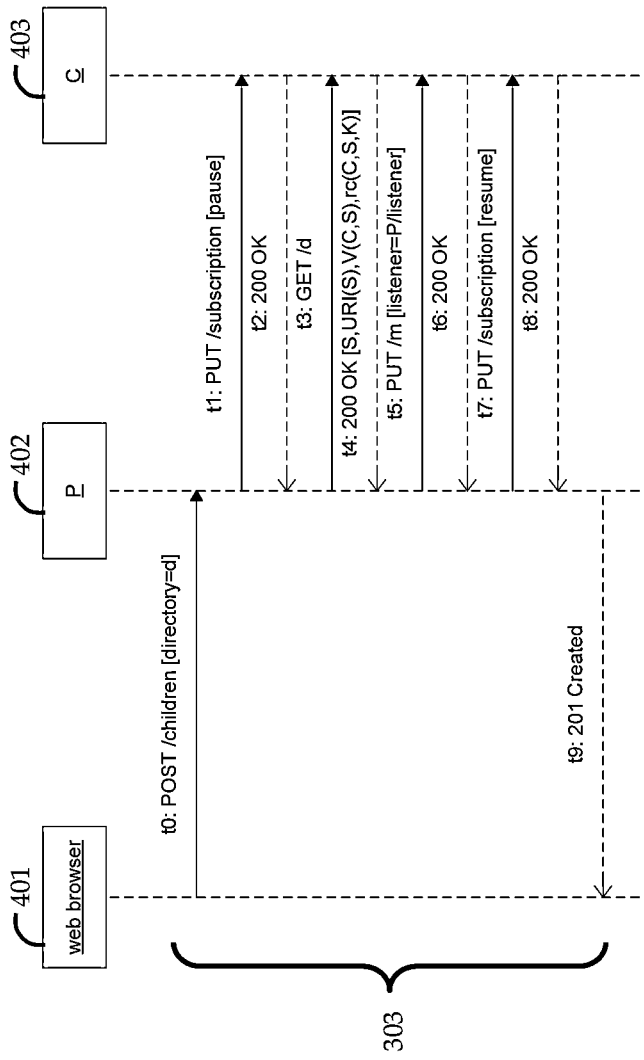
FIG. 4 illustrates a Tree Join process in accordance with an embodiment of the invention.

Referring to FIG. 4, Join process 303 is carried out by an administrator using a web browser 401 to add child node 403 as a child of parent node 402. The message sequence diagram of the join process, illustrating messages t0 through t9, is illustrated in FIG. 4. A location at which to join a child node to the overlay tree may be selected based on factors such as load balancing at the nodes, or distributing the knowledge base more evenly, etc.

Join process 303 embeds the service discovery process and event subscription process without recursion between a pause operation (message t1 and message t2) and a resume operation (message t7 and message t8). The pause and resume operations postpone the processing of updating events received by child node 403 until its state and event channels are obtained by parent node 402. Without the pause, any update events to child node 403 received between message t4 and message t6 would be lost and the violation would never be corrected.

Once parent node 402 retrieves $V(C,S_i)$ and $rc(C,S_i,K_j)$ at message t4, parent node 402 updates $V(P,S_i)$ and $rc(P,S_i,K_j)$ as if an event $kb\_added(S,K_j,rc(C,S_i,K_j))$ is triggered for every $S_i$ in C and every $K_j$ in $V(C,S_i)$. It is evident that the values obtained by parent node 402 at message t4 may be outdated if any update events arrive at child node 403 between message t1 and message t7. However, these update events will be kept and dispatched after message t7 and P will be resynchronized thereafter.

For Join process 303, the violation time is the time difference from message t8 to message t0 if there are held update events, or the time difference from message t5 to message t0 if there are no held update events. The maximum number of messages to correct the violation is 8.

Figure 5:
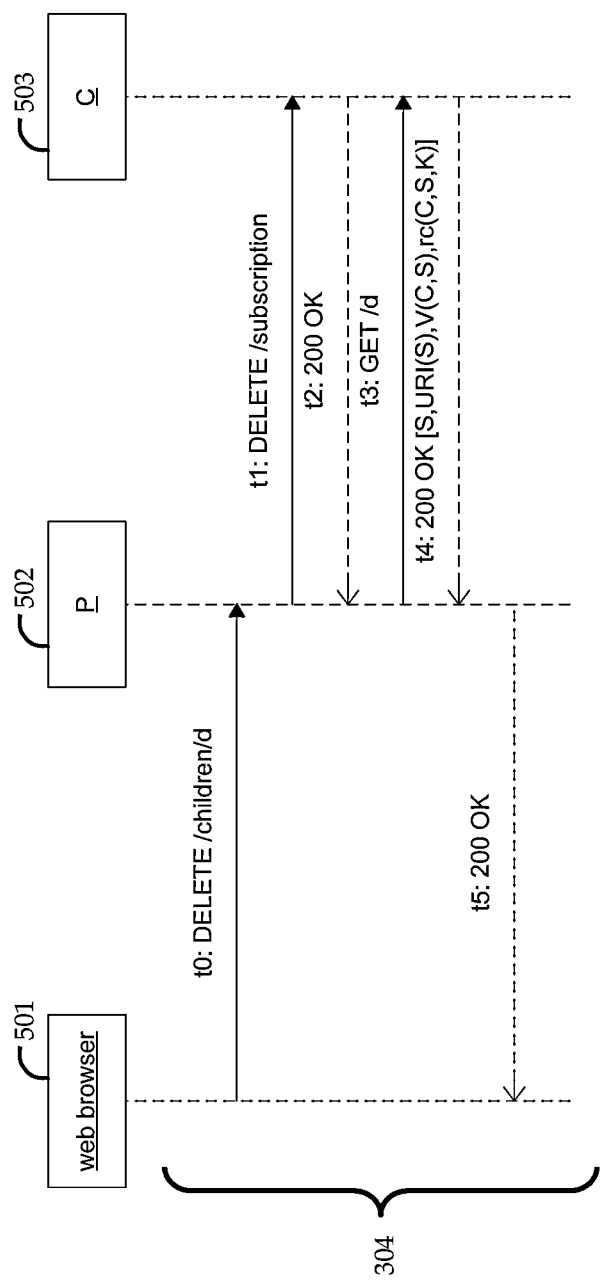
FIG. 5 illustrates a Tree Cut process in accordance with an embodiment of the invention.

FIG. 5 illustrates a sequence diagram for Cut process 304. Cut process 304 may be used, e.g., when repairing or replacing the node that is cut. An administrator using a web browser 501 initiates Cut process 304 by sending message t0 to a parent node 502 to cut the overlay tree. Parent node 502 in turn sends message t1 to child node 503 to cut the overlay tree, as indicated by a subscription identifier. The subscription identifier was assigned by message t7 of RESTful event subscription process 220 (see FIG. 2). Once parent node 502 requests (via message t3) and retrieves (via message t4) $V(C, S_i)$ and $rc(C,S_i,K_j)$, it updates $V(P,S_i)$ and $rc(P,S_i,K_j)$ as if an event $kb\_deleted(S,K_j,rc(C,S_i,K_j))$ is triggered for every service $S_i$ on child node 503 and every knowledge base fragment $K_j$ in $V(C,S_i)$. The violation time is the time difference from message t5 to message t0 and the number of messages used to correct the violation is four. Cut process 304 does not involve a pause and resume operation, unlike join process 303, because the nodes removed by cut process 304 are no longer monitored by the remaining portion of the overlay tree. Therefore, the events accumulated in the root of the removed portion of the overlay tree can be discarded.

Experimental Results

A prototype system was implemented using SWI-Prolog with HTTP and Semantic Web libraries. The parallel service compositions were implemented based on its multithread and message queue facilities. In the following experiments, all nodes were running on two computers connected by LAN: a Windows 2003 Server machine with Dual Core (3.0 GHz and 2.99 GHz) and 2 GM RAM, and a Linux machine with 1.6 GHz CPU/4 GB RAM. To focus on communication cost and parallelism overhead, a small knowledge base of 44 MB is used. The time measurements (in millisecond) are obtained by Prolog time/1 predicate on the root nodes for compositions and on the leaf node for notifications.

FIG. 6 illustrates a first experiment that measured the completion time of the service discovery process at the root node on the Windows machine. The x-axis represents the number of children nodes on three machines. The y-axis represents time in milliseconds. The number of child nodes on the Linux machine was increased, and the average CPU time of 10 trials for each tree was recorded. In this case, the completion time increased linearly with the number of child nodes.

FIG. 7 illustrates a second experiment measured the completion time of event subscription process in the same way. The x-axis represents the number of children nodes on three machines. The y-axis represents time in milliseconds. In this case, the completion time increased linearly with the number of child node.

FIG. 8 illustrates a third experiment measured the completion time of event notification process, along with discovery and subscription processes, when the depth of the 1-ary tree increases. "Depth" refers to the longest path (i.e., the most number of links) from the root to a leaf, wherein a 1-ary tree is a tree in which each parent has one child. The x-axis represents the height of the tree on two machines. The y-axis represents time in milliseconds. In this case, the completion time of discovery and subscription processes increased linearly with the depth, while the completion time for notifications stayed at 0. The notification time did not increase with the tree depth since each node used a different thread to deliver new notifications triggered by received notifications.

Application to Rest Overlay Tree

This invention chooses a tree structured overlay network to connect the REST knowledge servers (nodes) in an enterprise because a tree provides a single entry point (URI) for clients and is easy to extend. In this tree, each REST server hosts a set of REST services. Each service accepts a request and returns a response by consulting available knowledge bases. The services in a node also interact with other services over the two-way links. The composition links allow parent services to send requests to their children services and the notification links allow the children to send event notifications to their parents. A large knowledge base is broken into fragments and distributed among the REST servers. As the result, a knowledge service can directly access the local knowledge bases through memory or disk.

A goal of this system is to provide transparent access to the distributed knowledge bases and a consistent view of them. Transparent access means that a knowledge service can consult a knowledge base regardless how it is distributed. A consistent view tracks the knowledge bases used by each knowledge service as the knowledge bases undergo independent changes. The consistent view allows clients of these knowledge services to select appropriate knowledge bases to customize the response of a requested service in different situations. For example, when reading a medical document, a user may want an annotation service to just annotate concepts related to the medical knowledge bases. A consistent view also allows a parent service to avoid unnecessary compositions when its children do not have required knowledge bases.

To achieve these goals, embodiments in accordance with the present invention include usage of a "virtual knowledge base" ("VKB") to refer to a set of knowledge bases ("KB") distributed over a network that are accessible to a knowledge service at a given point of time. Transparent access to virtual knowledge bases is achieved through recursive composition of knowledge services replicated over the network. For efficiency, a parent service sends identical service requests in parallel to its child services and combines the partial results from the children into the final response. The child services process a request recursively as its parent, thus sending a request to a grandchild. Consistent views are achieved by event-driven knowledge synchronization over notification links established by the REST services described herein, in accordance with an embodiment of the invention. Instead of creating a fixed two-way overlay tree for the entire enterprise in one step, the tree is created incrementally from smaller trees owned by different organizations and portions of the tree may be removed for maintenance. To support these topological changes, we introduce the Join and Cut operations and processes that can be applied to trees in operation without disrupting their services or losing any update events. Furthermore, the processes reduce the violation time and number of correction messages. An update event is an event that represents updates to a knowledge bases.

Embodiments in accordance with the present invention include two tree operations and the corresponding REST (REpresentational State Transfer) processes: join and cut, to change the topology of an overlay tree that includes REST knowledge servers, without disrupting the running services or losing any propagating events. These operations allow a large distributed working knowledge system to be assembled dynamically and incrementally from working subsystems and portions of the system to be removed and replaced by new subsystems. These operations are useful for creating large scale knowledge systems from federated servers owned and managed by different organizations without any central coordination.

The detailed processes are illustrated by the Join and Cut processes of FIGS. 4 and 5.

The proposed join and cut processes allows incremental creation of large knowledge base systems. The creation process minimizes the violation time of the system invariants with minimal number of corrective messages. The join and cut processes are based on REST services that can be discovered across, extended through, accessed using and integrated with the Web.

Figure 9:
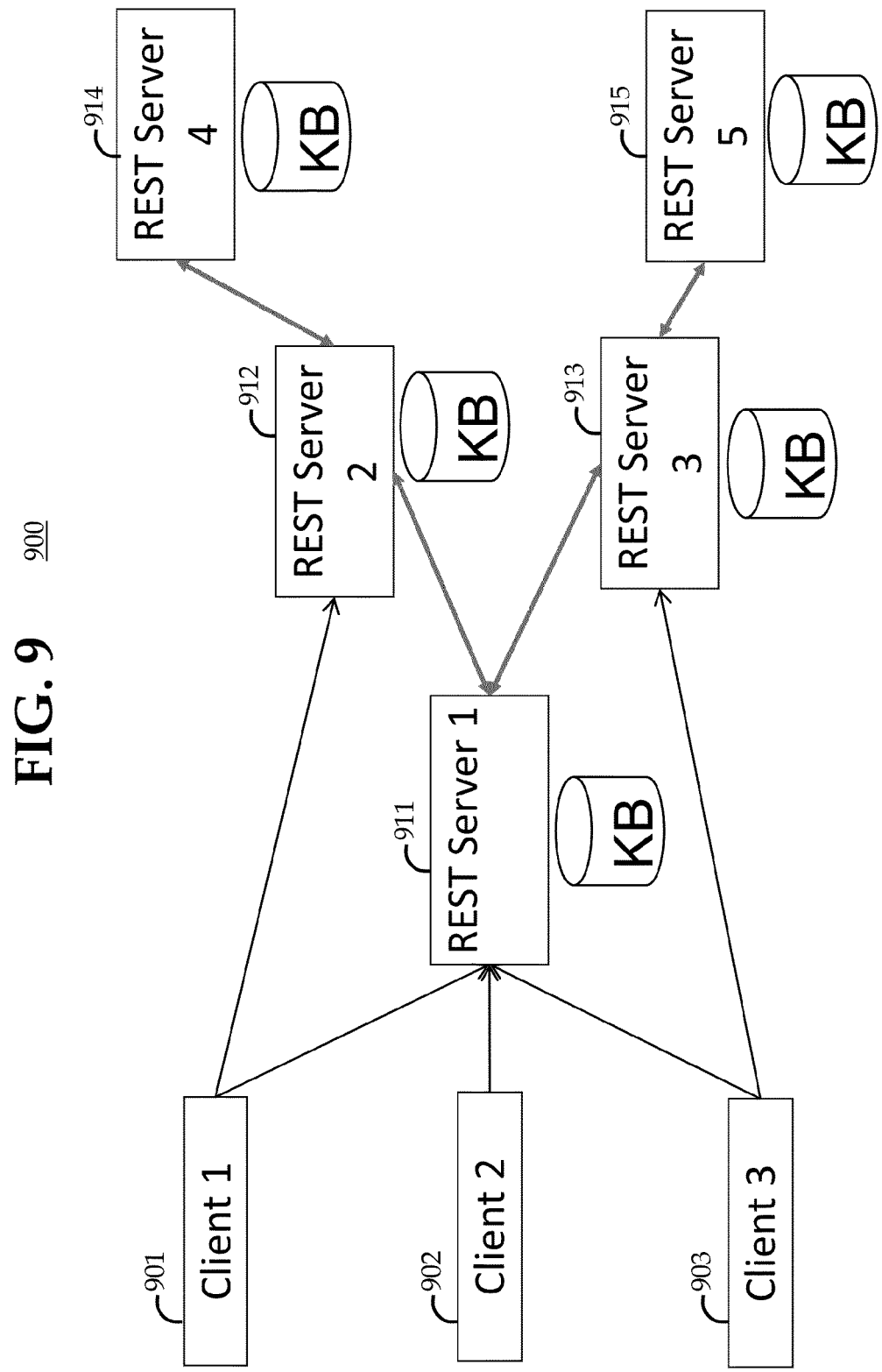
FIG. 9 illustrates a distributed knowledge base network in accordance with an embodiment of the invention.

FIG. 9 illustrates a system 900 in accordance with an embodiment of the invention. System 900 includes a first client 901, a second client 902, a third client 903, and five REST servers 911 through 915, interconnected as shown. Each REST server of system 900 includes an associated fragment of a knowledge base. REST servers 911 through 915 run a set of knowledge base functions (e.g. tagging, find expert, etc.) linked by composition (i.e., combining multiple outputs from different nodes into one output for a client) and notification.

Figure 10:
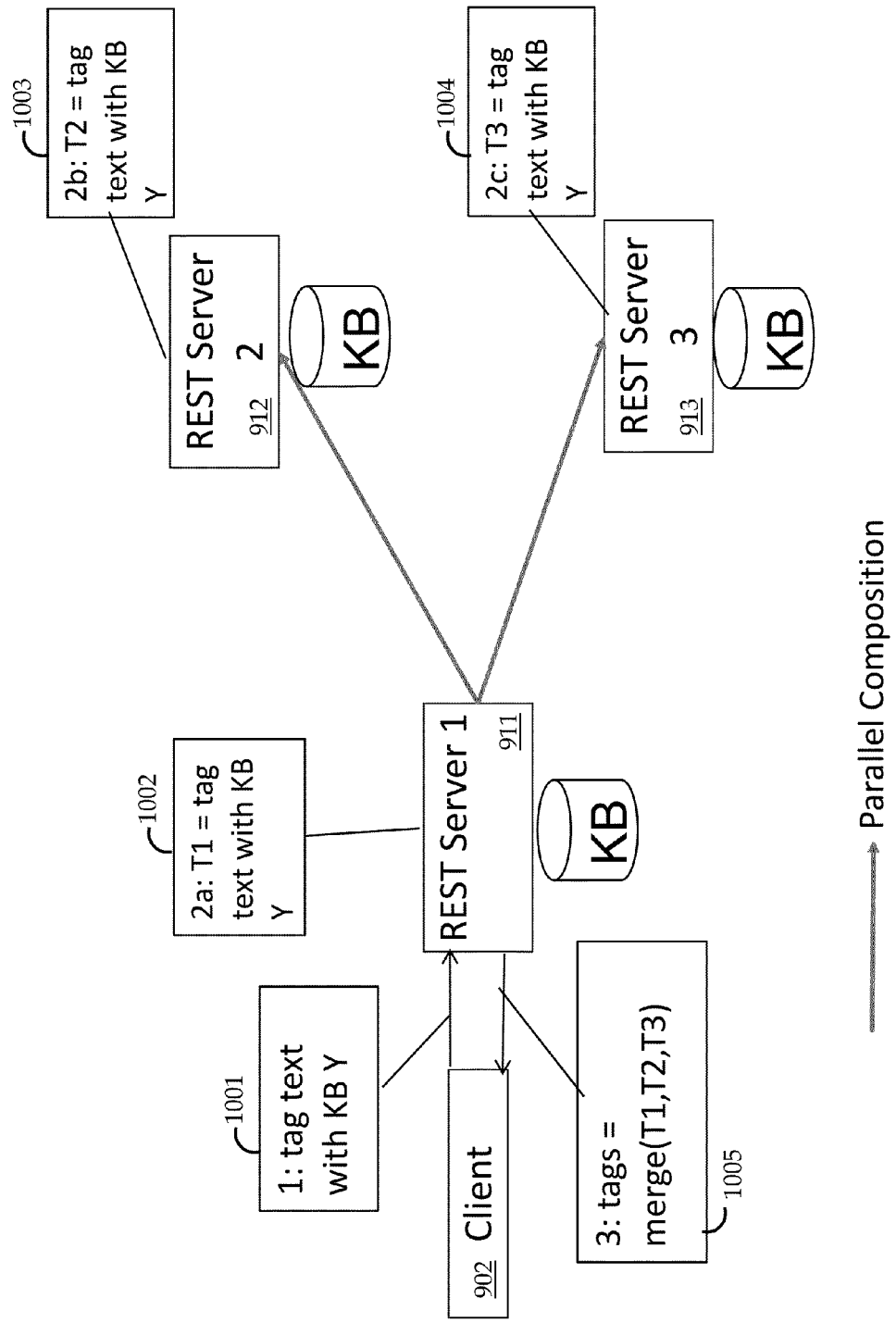
FIG. 10 illustrates a composition process in accordance with an embodiment of the invention.

FIG. 10 illustrates an expanded portion 1000 of FIG. 9, in which a parallel recursive composition is performed. When client 902 desires to query a database, client 902 needs to know what knowledge bases are available through REST server 911. In turn, REST server 911 needs to know if it is storing at least a fragment of the requested knowledge base locally, and whether any children of REST server 911 (in this configuration, REST servers 912 and 913) are storing at least a fragment of the requested knowledge. The answer may be provided by having a REST server maintain a consistent view of all the fragments of the virtual knowledge bases in itself and its children REST servers. This answer is attained by using real-time events to synchronize virtual knowledge bases that are subject to being updated independently.

At a high level of abstraction, client 902 uses message 1001 to instruct root REST server 911 to tag (i.e., to identify) all text, data elements, etc., which are part of a knowledge base "Y". REST server 911 at step 1002 will identify all local text, data elements, etc., which are part of a knowledge base "Y", and at the essentially the same time recursively transmit the request to all of its child REST servers (i.e., REST servers 912 and 913). REST server 912 at step 1003 and REST server 913 at step 1004 will in turn identify all text, data elements, etc., local to the respective REST servers, which are part of a knowledge base "Y". This process would continue recursively for any child REST servers of REST servers 912 and 913.

The query results from each REST server are passed upstream back to root REST server 911, which merges all of the returned results and at step 1005 provides a combined view of the query of knowledge base Y.

Figure 11:
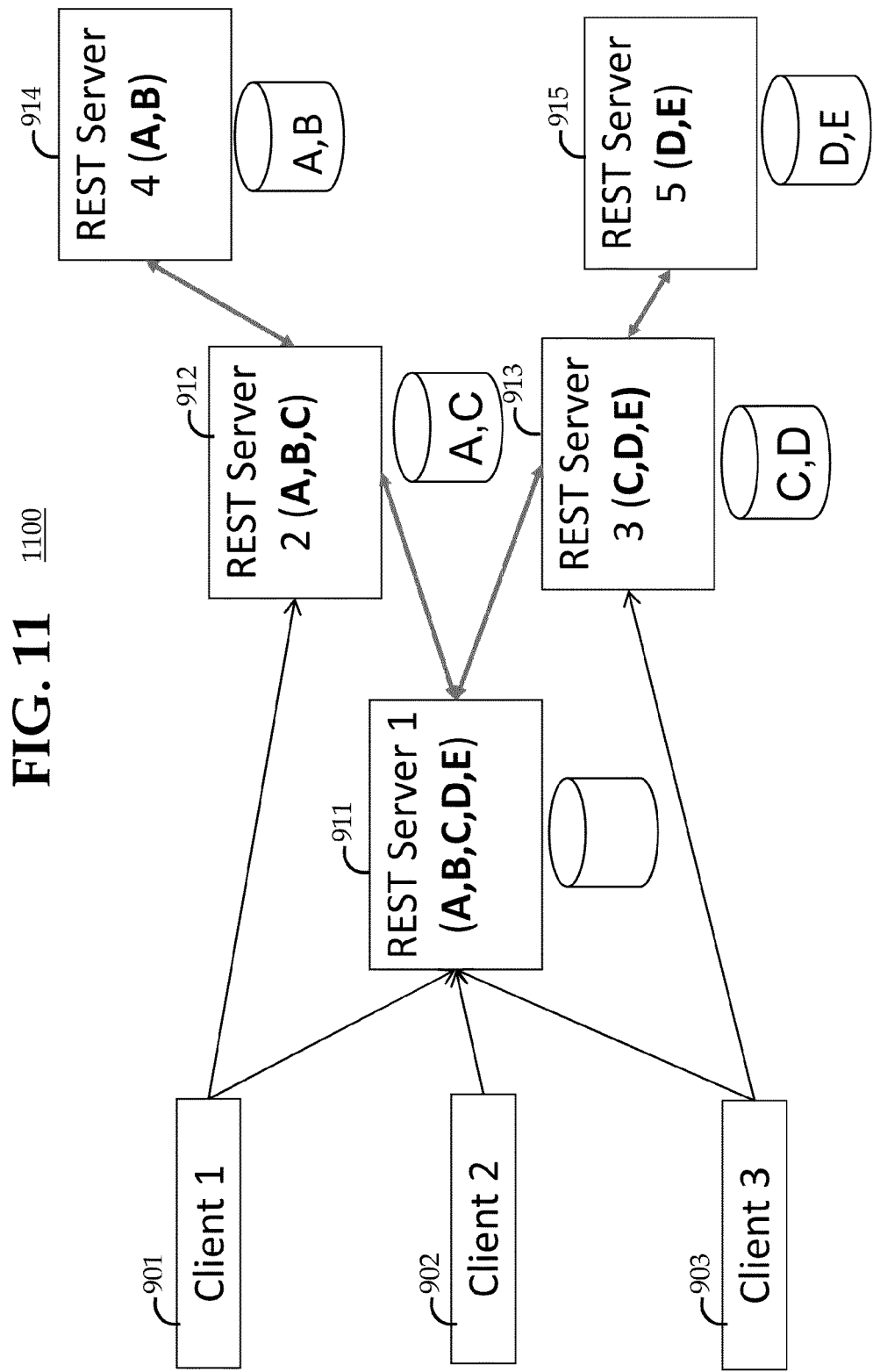
FIG. 11 illustrates a virtual knowledge base topology in accordance with an embodiment of the invention.

FIG. 11 illustrates an example of a system 1100 in accordance with an embodiment of the invention in which five fragments of a knowledge base, the fragments identified as A, B, C, D and E, are distributed across five REST servers identified as 911, 912, 913, 914 and 915.

Figure 13:
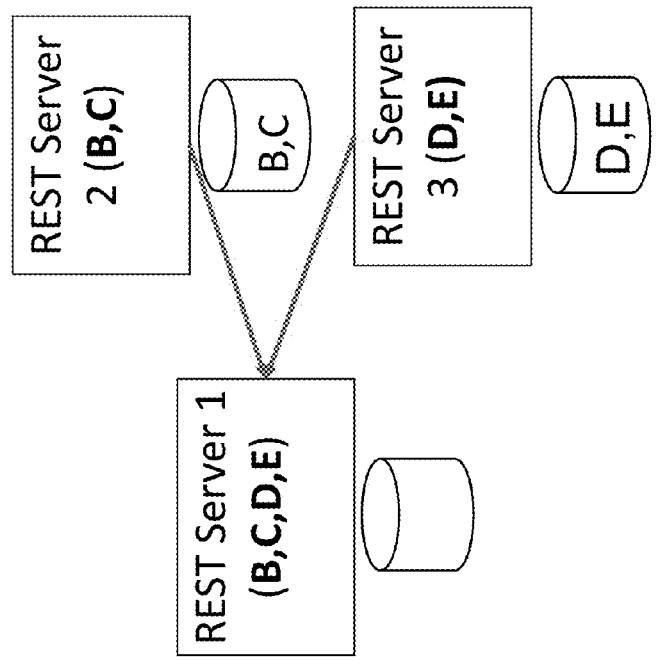
FIG. 13 illustrates a virtual knowledge base topology after a notification process, in accordance with an embodiment of the invention.
Figure 12:
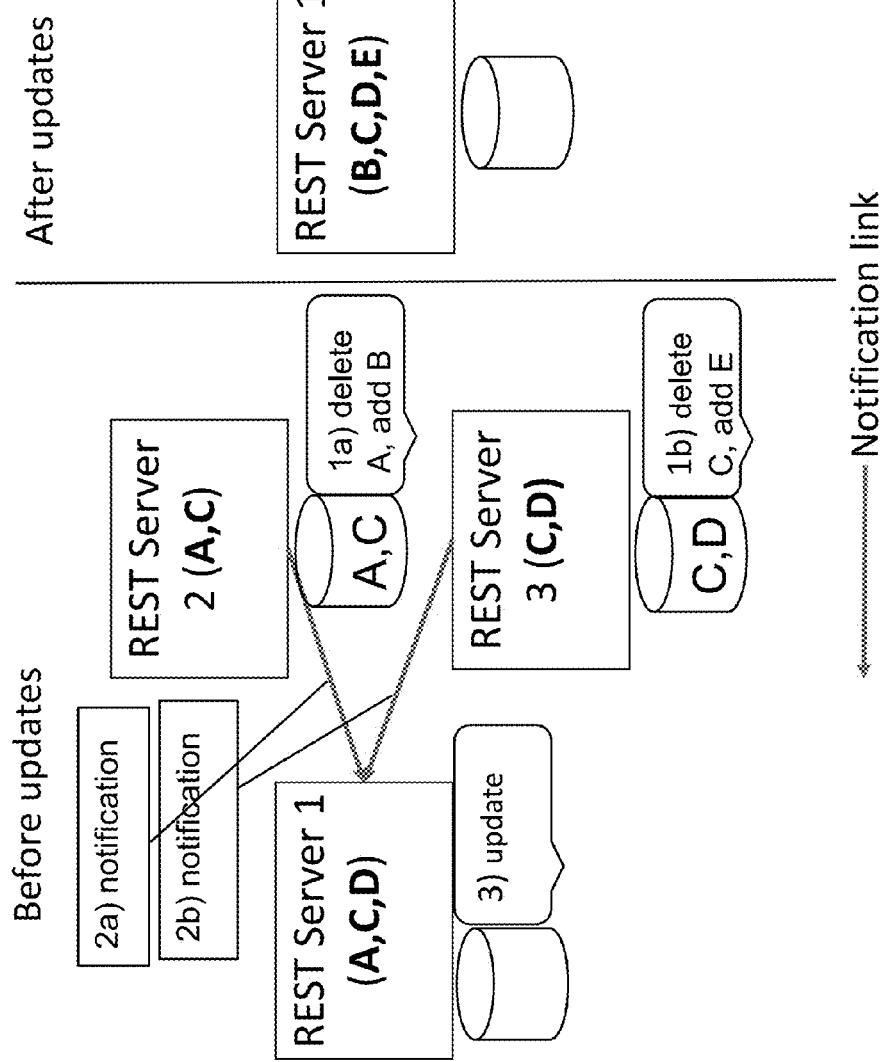
FIG. 12 illustrates a virtual knowledge base topology before a notification process, in accordance with an embodiment of the invention.

FIG. 12 and FIG. 13 together illustrate before and after configurations of fragments of a database. FIG. 12 illustrates locations of four fragments A, B, C and D of a knowledge base, stored among three REST servers. As illustrated, REST server 1 is the root and has child REST servers 2 (storing fragments A, C) and REST server 3 (storing fragments C, D). Consequently, the fragments available to REST server 1 are A, C and D. REST server 2 then updates its knowledge base by deleting fragment A and adding fragment B. A notification is sent to REST server 1. Similarly, REST server 3 deletes fragment C, adds fragment E, and sends a notification to REST server 1.

FIG. 13 illustrates the state of the knowledge base of FIG. 12 after the updates are applied. As illustrated, REST server 1 now has available to it fragments B, C, D and E.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the present invention to the precise form disclosed. Modifications and variations are possible in light of the above teachings or may be acquired from practice of the present invention.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶ 6, and any claim without the word "means" is not so intended.

What is claimed is:

1. A system to provide event-driven synchronization of a database distributed among a plurality of servers connected in a tree topology, comprising:
    a root server further comprising a transceiver coupled to a processor, where the transceiver is configured to transmit, from the root server of the tree topology, a composition request to child servers at a first predetermined level;
    the child servers at the first predetermined level of the tree topology, wherein each of the child servers at the first predetermined level further comprises a transceiver coupled to a processor, the transceiver configured to recursively transmit a composition request to child servers at a second predetermined level of the tree topology, wherein the second predetermined level is lower than the first predetermined level;
    the child servers at the second predetermined level of the tree topology, wherein each of the child servers at the second predetermined level further comprises a transceiver coupled to a processor, the transceiver configured to recursively transmit a notification message to child servers at the first predetermined level of the tree topology, wherein the notification message comprises an identification of database fragments accessible to the child server;
    at child servers at the first predetermined level of the tree topology, the transceiver transmits respective notification messages to the root server in the response to receiving the notification messages, wherein each of the child servers at the first predetermined level combines results received in the notification messages from their respective child servers at the second predetermined level with results associated with database fragments accessible to the child server itself;
    wherein the root server merges the respective notification messages and synchronizes an availability of database fragments from the respective notification messages transmitted to the root server to form a virtual knowledge database,
    wherein the step of recursively transmitting, from each child server of a first predetermined level of the tree topology, a composition request to child servers at a second predetermined level of the tree topology, comprises evaluating the following relationship:

$$V(P, S_i) = K(P, S_i) \cup \bigcup_{C \in c(P)} V(C, S_i)$$

wherein:
    P comprises a parent node;
    C comprises a child node;
    $S_i$ comprises a knowledge service on node i;
    i comprises an index variable;
    V( ) comprises a view of virtual knowledge base for service $S_i$ at node P;
    K( ) comprises a knowledge base for service $S_i$ at node P; and
    c(P) comprises a set of child nodes of node P.

2. The system of claim 1, wherein the root server and child servers provide RESTful web services.

3. The system of claim 1, wherein the tree topology comprises an overlay network of REST servers connected by a composition links and a notification links.

4. The system of claim 3, further comprising the steps of:
    pausing a processing of update events;
    retrieving a reference count from a root node of a subtree to add to the tree topology;
    updating a database mapping in the root server; and
    resuming the processing of update events.

5. The system of claim 4, wherein the reference count is determined in accordance with the following relationship:

$$rc(P, S_i, K_j) = |f(P, S_i, K_j)| + \sum_{C \in c(P)} rc(C, S_i, K_j)$$

wherein:
    rc( ) comprises a reference count function;
    f( ) comprises a set of fragments of knowledge base Kj;
    P comprises a parent node;
    C comprises a child node;
    c(P) comprises a set of child nodes of node P;
    Si comprises a service;
    Kj comprises a fragment of a knowledge base; and
    i, j comprise index variables.

6. The system of claim 4, further comprising: exchanging corrective messages between a node of the overlay tree and the root node of the subtree in order to add to the tree topology.

7. The system of claim 4, further comprising:
    providing a delete command to child servers; and
    updating a database mapping in a parent server.

8. A method of event-driven synchronization of a database distributed among a plurality of servers connected in a tree topology, comprising:

transmitting, from a root server of the tree topology, a composition request to a first level of child servers of the root server;

recursively transmitting, from each child server of a first predetermined level of the tree topology, a composition request to child servers at a second predetermined level of the tree topology, wherein the second predetermined level is lower than the first predetermined level;

recursively transmitting, from each child server of the second predetermined level of the tree topology, a notification message to child servers at the first predetermined level of the tree topology, wherein the notification message comprises an identification of database fragments accessible to the child server;

transmitting, from child servers at the first predetermined level of the tree topology, respective notification messages to the root server, wherein the root server synchronizes an availability of database fragments from the respective notification messages transmitted to the root server, wherein the step of recursively transmitting, from each child server of a first predetermined level of the tree topology, a composition request to child servers at a second predetermined level of the tree topology, comprises evaluating the following relationship:

$$V(P, S_i) = K(P, S_i) \cup \bigcup_{C \in c(P)} V(C, S_i)$$

wherein:
P comprises a parent node;
C comprises a child node;
$S_i$ comprises a knowledge service on node i;
i comprises an index variable;
V( ) comprises a view of virtual knowledge base for service $S_i$ at node P;
K( ) comprises a knowledge base for service $S_i$ at node P; and
c(P) comprises a set of child nodes of node P.

9. The method of claim 8, wherein the root server and child servers provide RESTful web services.

10. The method of claim 8, wherein the tree topology comprises an overlay network of REST servers connected by a composition links and a notification links.

11. The method of claim 10, further comprising the steps of:
pausing a processing of update events;
retrieving a reference count from a root node of a subtree to add to the tree topology;
updating a database mapping in the root server; and
resuming the processing of update events.

12. The method of claim 11, wherein the reference count is determined in accordance with the following relationship:

$$rc(P, S_i, K_j) = |f(P, S_i, K_j)| + \sum_{C \in c(P)} rc(C, S_i, K_j)$$

wherein:
rc( ) comprises a reference count function;
f( ) comprises a set of fragments of knowledge base Kj;
P comprises a parent node;
C comprises a child node;
c(P) comprises a set of child nodes of node P;
Si comprises a service;
Kj comprises a fragment of a knowledge base; and
i, j comprise index variables.

13. The method of claim 11, further comprising: exchanging corrective messages between a node of the overlay tree and the root node of the subtree in order to add to the tree topology.

14. The method of claim 11, further comprising:
providing a delete command to child servers; and
updating a database mapping in a parent server.

15. A method of event-driven synchronization of a database distributed among a plurality of servers connected in a tree topology, comprising:
transmitting, from a root server of the tree topology, a composition request to a first level of child servers of the root server, wherein the tree topology comprises an overlay network of REST servers connected by a composition links and a notification links;

recursively transmitting, from each child server of a first predetermined level of the tree topology, a composition request to child servers at a second predetermined level of the tree topology, wherein the second predetermined level is lower than the first predetermined level;

recursively transmitting, from each child server of the second predetermined level of the tree topology, a notification message to child servers at the first predetermined level of the tree topology, wherein the notification message comprises an identification of database fragments accessible to the child server;

transmitting, from child servers at the first predetermined level of the tree topology, respective notification messages to the root server, wherein the root server synchronizes an availability of database fragments from the respective notification messages transmitted to the root server, pausing a processing of update events;
retrieving a reference count from a root node of a subtree to add to the tree topology;
updating a database mapping in the root server; and
resuming the processing of update events,
wherein the reference count is determined in accordance with the following relationship:

$$rc(P, S_i, K_j) = |f(P, S_i, K_j)| + \sum_{C \in c(P)} rc(C, S_i, K_j)$$

wherein:
rc( ) comprises a reference count function;
f( ) comprises a set of fragments of knowledge base Kj;
P comprises a parent node;
C comprises a child node;
c(P) comprises a set of child nodes of node P;
Si comprises a service;
Kj comprises a fragment of a knowledge base; and
i, j comprise index variables.

* * * * *